(12) United States Patent
Huang et al.

(10) Patent No.: US 10,431,210 B1
(45) Date of Patent: Oct. 1, 2019

(54) IMPLEMENTING A WHOLE SENTENCE RECURRENT NEURAL NETWORK LANGUAGE MODEL FOR NATURAL LANGUAGE PROCESSING

(71) Applicant: International Business Machines Corporation, Armonk, NY (US)

(72) Inventors: Yinghui Huang, New York, NY (US); Abhinav Sethy, Chappaqua, NY (US); Kartik Audhkhasi, White Plains, NY (US); Bhuvana Ramabhadran, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/954,399

(22) Filed: Apr. 16, 2018

(51) Int. Cl.
| | |
|---|---|
| *G10L 15/197* | (2013.01) |
| *G10L 15/16* | (2006.01) |
| *G06N 3/08* | (2006.01) |
| *G10L 15/22* | (2006.01) |
| *G06N 7/00* | (2006.01) |
| *G10L 15/06* | (2013.01) |

(52) U.S. Cl.
CPC ............. *G10L 15/197* (2013.01); *G06N 3/08* (2013.01); *G06N 7/005* (2013.01); *G10L 15/063* (2013.01); *G10L 15/16* (2013.01); *G10L 15/22* (2013.01)

(58) Field of Classification Search
CPC ....... G10L 15/197; G10L 15/16; G10L 15/22; G10L 15/063; G06N 3/08; G06N 7/005
See application file for complete search history.

(56) References Cited

U.S. PATENT DOCUMENTS

| | | |
|---|---|---|
| 2007/0100624 A1 | 5/2007 | Weng et al. |
| 2015/0032449 A1 | 1/2015 | Sainath et al. |
| 2015/0066496 A1 | 3/2015 | Deoras et al. |
| 2015/0095017 A1 | 4/2015 | Mnih et al. |
| 2015/0269934 A1 | 9/2015 | Biadsy et al. |

(Continued)

FOREIGN PATENT DOCUMENTS

EP       1232492 B1       12/2003

OTHER PUBLICATIONS

Zhang, Xingxing, Liang Lu, and Mirella Lapata. "Top-down tree long short-term memory networks." arXiv preprint arXiv:1511. 00060 (2015). (Year: 2015).*

(Continued)

*Primary Examiner* — Brian L Albertalli
(74) *Attorney, Agent, or Firm* — Amy J. Pattillo; Feb Cabrasawan

(57) ABSTRACT

A whole sentence recurrent neural network (RNN) language model (LM) is provided for for estimating a probability of likelihood of each whole sentence processed by natural language processing being correct. A noise contrastive estimation sampler is applied against at least one entire sentence from a corpus of multiple sentences to generate at least one incorrect sentence. The whole sentence RNN LN is trained, using the at least one entire sentence from the corpus and the at least one incorrect sentence, to distinguish the at least one entire sentence as correct. The whole sentence recurrent neural network language model is applied to estimate the probability of likelihood of each whole sentence processed by natural language processing being correct.

20 Claims, 9 Drawing Sheets

(56) References Cited

U.S. PATENT DOCUMENTS

| | | | |
|---|---|---|---|
| 2016/0005399 | A1 | 1/2016 | Audhkhasi et al. |
| 2016/0034814 | A1 | 2/2016 | Audhkhasi et al. |
| 2017/0061250 | A1* | 3/2017 | Gao .................. G06F 16/3347 |
| 2017/0270100 | A1 | 9/2017 | Audhkhasi et al. |
| 2018/0033433 | A1 | 2/2018 | Kurata et al. |
| 2018/0075341 | A1 | 3/2018 | Dasgupta et al. |
| 2018/0082167 | A1 | 3/2018 | Kurata et al. |
| 2018/0267956 | A1* | 9/2018 | Chang .................. G06F 17/2775 |
| 2019/0130221 | A1* | 5/2019 | Bose .................... G06K 9/6257 |

OTHER PUBLICATIONS

Huang, Yinghui, et al. "Whole sentence neural language models." 2018 IEEE International Conference on Acoustics, Speech and Signal Processing (ICASSP). IEEE, 2018. (Year: 2018).*

Wang, Bin, and Zhijian Ou. "Learning neural trans-dimensional random field language models with noise-contrastive estimation." 2018 IEEE International Conference on Acoustics, Speech and Signal Processing (ICASSP). IEEE, 2018. (Year: 2018).*

Goldberg, Yoav, "A Primer on Neural Network Models for Natural Language Processing", Oct. 6, 2015, 75 pages, available via the Internet at <http://www.cs.biu.ac.il/˜yogo/nnlp.pdf.>.

"A Beginner's Guide to Recurrent Networks and LSTMs", 12 pages, accessed via the Internet at <https://deeplearning4j.org/lstm.html> as of Apr. 15, 2018.

Chen et al., "Efficient Sampling and Feature Selection in Whole Sentence Maximum Entropy Language Models", 1999 IEEE International Conference on Acoustics, Speech, and Signal Processing. Proceedings. ICASSP99 (Cat. No. 99CH36258), Phoenix, AZ, 1999, pp. 549-552 vol. 1, 4 pages.

Chen et al., "Recurrent Neural Network Language Model Training with Noise Contrastive Estimation for Speech Recognition", 2015 IEEE International Conference on Acoustics, Speech and Signal Processing (ICASSP), South Brisbane, QLD, 2015, pp. 5411-5415, 5 pages.

Collobert et al., "Natural Language Processing (Almost) from Scratch", Journal of Machine Learning Research, 2011, pp. 2493-2537, 45 pages.

Kim, Yoon, "Convolutional Neural Networks for Sentence Classification", Proceedings of the 2014 Conference on Empirical Methods in Natural Language Processing (EMNLP), pp. 1746-1751, Oct. 25-29, 2014, Doha, Qatar, 6 pages.

Kiros et al., "Skip-Thought Vectors", University of Toronto, Canadian Institute for Advanced Research, submitted on Jun. 22, 2015, available via the Internet at <https://arxiv.org/abs/1506.06726>, 11 pages.

Ma et al., "Dependency-based Convolutional Neural Networks for Sentence Embedding", 6 pages, Aug. 3, 2015, available via the Internet at <https://arxiv.org/abs/1507.01839>.

Wieting et al., "Towards Universal Paraphrastic Sentence Embeddings", ICLR 2016, submitted on Mar. 4, 2016, 19 pages, available via the Internet at <https://arxiv.org/abs/1511.08198>.

Mikolov et al., "Recurrent Neural Network based Language Model", Interspeech 2010, Sep. 26, 2010, Japan, 4 pages.

Mikolov et al., "Conext Dependent Recurrent Neural Network Language Model", Microsoft Research Technical Report, Jul. 27, 2012, 10 pages.

Rosenfeld, R., "A Whole Sentence Maximum Entropy Language Model", 1997 IEEE Workshop on Automatic Speech Recognition and Understanding Proceedings, Santa Barbara, CA, 1997, pp. 230-237, 8 pages.

* cited by examiner

| TEST SET | PROJECTION LAYER | HIDDEN LAYER |
|---|---|---|
| SWB | 512 | 512 |
| CI | 256 | 256 |

| SPEECH RECOGNITION ERROR RATE (%) | | |
|---|---|---|
| | SWB | CI |
| N-GRAM | 6.9 | 8.5 |
| WHOLE SENTENCE | 6.3 | 8.3 |

IMPLEMENTING A WHOLE SENTENCE RECURRENT NEURAL NETWORK LANGUAGE MODEL FOR NATURAL LANGUAGE PROCESSING

BACKGROUND

1. Technical Field

This invention relates in general to computing systems and more particularly to implementing a whole sentence a recurrent neural network language model for natural language processing.

2. Description of the Related Art

A recurrent neural network (RNN) is a class of neural networks that includes weighted connections within a layer, in comparison to a traditional feed-forward network, where connections feed only to subsequent layers. RNNs can also include loops, which enables an RNN to store information while processing new inputs, facilitating use of RNNs for processing tasks where prior inputs need to be considered, such as time series data implemented for speech recognition and natural language processing (NLP) tasks.

BRIEF SUMMARY

In one embodiment, a method is directed to providing, by a computer system, a whole sentence recurrent neural network language model for estimating a probability of likelihood of each whole sentence processed by natural language processing being correct. The method is directed to applying, by the computer system, a noise contrastive estimation sampler against at least one entire sentence from a corpus of multiple sentences to generate at least one incorrect sentence. The method is directed to training, by the computer system, the whole sentence recurrent neural network language model, using the at least one entire sentence from the corpus and the at least one incorrect sentence, to distinguish the at least one entire sentence as correct. The method is directed to applying, by the computer system, the whole sentence recurrent neural network language model to estimate the probability of likelihood of each whole sentence processed by natural language processing being correct.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to provide a whole sentence recurrent neural network language model for estimating a probability of likelihood of each whole sentence processed by natural language processing being correct. The stored program instructions comprise program instructions to apply a noise contrastive estimation sampler against at least one entire sentence from a corpus of a plurality of sentences to generate at least one incorrect sentence. The stored program instructions comprise program instructions to train the whole sentence recurrent neural network language model, using the at least one entire sentence from the corpus and the at least one incorrect sentence, to distinguish the at least one entire sentence as correct. The stored program instructions comprise program instructions to apply the whole sentence recurrent neural network language model to estimate the probability of likelihood of each whole sentence processed by natural language processing being correct.

In another embodiment, a computer program product comprises a computer readable storage medium having program instructions embodied therewith, wherein the computer readable storage medium is not a transitory signal per se. The computer program product comprising the program instructions executable by a computer to cause the computer to provide, by a computer, a whole sentence recurrent neural network language model for estimating a probability of likelihood of each whole sentence processed by natural language processing being correct. The computer program product comprising the program instructions executable by a computer to cause the computer to apply, by the computer, a noise contrastive estimation sampler against at least one entire sentence from a corpus of a plurality of sentences to generate at least one incorrect sentence. The computer program product comprising the program instructions executable by a computer to cause the computer to train, by the computer, the whole sentence recurrent neural network language model, using the at least one entire sentence from the corpus and the at least one incorrect sentence, to distinguish the at least one entire sentence as correct. The computer program product comprising the program instructions executable by a computer to cause the computer to apply, by the computer, the whole sentence recurrent neural network language model to estimate the probability of likelihood of each whole sentence processed by natural language processing being correct.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
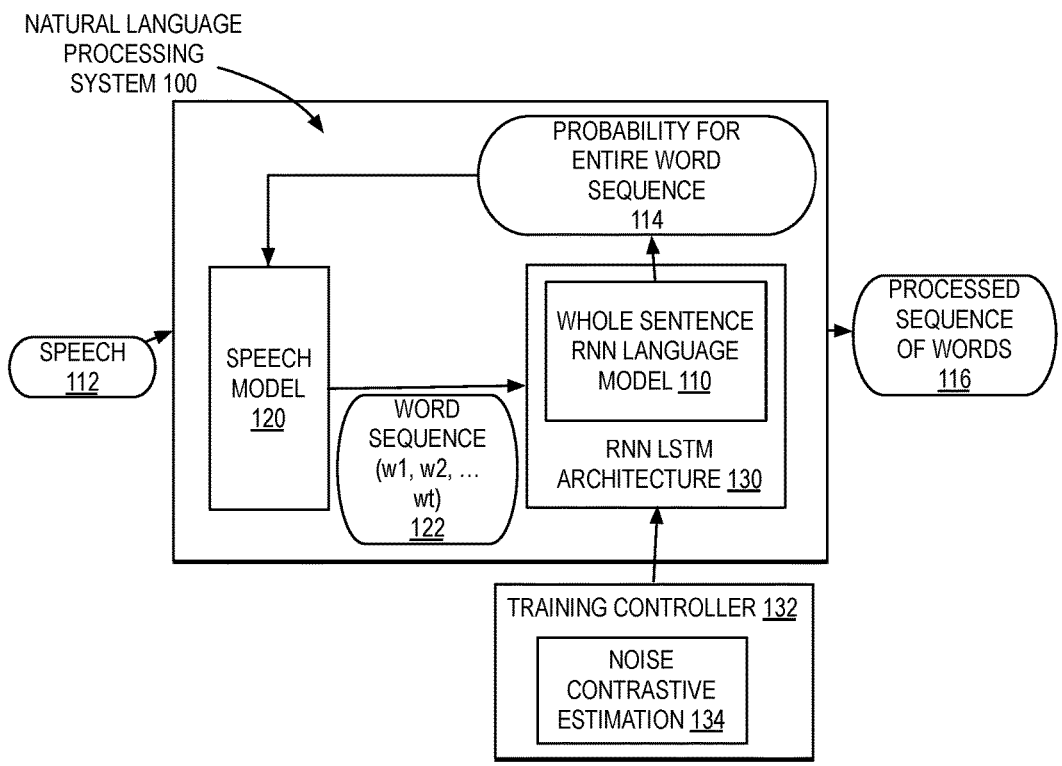
FIG. 1 is a block diagram illustrating one example of a system for utilizing a whole sentence RNN language model for improving the accuracy of natural language processing.

FIG. 1 illustrates a block diagram of one example of a system for utilizing a whole sentence RNN language model for improving the accuracy of natural language processing.

In one example, a natural language processing (NLP) system 100 may process a sequence of words in speech 112, as input, and generate one or more types of outputs, such as processed sequence of words 116. In one example, speech 112 may represent an entire sentence or utterance with multiple words. In one example, natural language processing system 100 may perform one or more types of language processing including, but not limited to, automatic speech recognition, machine translation, optical character recognition, spell checking, and additional or alternate types of processing of natural language inputs. In one example, automatic speech recognition may include, but is not limited to, conversational interaction, conversational telephony speech transcription, multimedia captioning, and translation. In one example, speech 112 may include, but are not limited to an audio signal with spoken words, an image containing a sequence of words, and a stream of text words.

In one example, to manage processing of speech 112, NLP system 100 may include a speech model 120, for translating the audio signal, image, or stream of text into statistical representations of the sounds, images, or text that make up each word in a sequence of words. In one example, the statistical representations of a word sequence 122 may be represented by sentence s of T words $w_1, w_2, \ldots, w_T$, where each w is a statistical representation of a word, phrase, or utterance. For example, speech model 120 may represent an acoustic model that is used to create statistical representations of the audio signal and the phonemes or other linguistic units within speech 112. In one example, speech model 120 may be trained from a set of audio recordings and their corresponding transcripts, created by taking audio recordings of speech and their text transcriptions and using software to create statistical representations of the sounds that make up each word.

In one example, in processing speech 112 into processed sequence of words 116, as NLP system 100 tries to match sounds with word sequences, to increase the accuracy of processing words and phrases that sound, look, or translate similarly, NLP system 100 may implement a language model (LM) to generate a probability distribution over a sequence of words, such as a whole sentence. The accuracy at which the LM generates a probability distribution for word sequence 122 impacts the accuracy of NLP system 100 to accurately process speech 112 into processed sequence of words 116.

In one embodiment of the present invention, NLP system 100 may implement a whole sentence RNN language model (LM) 110, which given a sequence of processed words of a whole sentence from speech 112 of word sequence 122, assigns a probability to the whole sentence, illustrated as probability for entire word sequence 114. In one example, providing whole sentence RNN LM 110 to estimate the relative likelihood of an entire phrase being correctly processed is useful in many natural language processing applications that may be performed by NLP system 100. For example, in the context of NLP system 100 performing speech recognition, NLP system 100 tries to match the sounds within speech 112 with word sequences. In this example, whole sentence RNN LM 110 may provide context to distinguish between words and phrases that sound similar, to assign a probability that the correct sentence has been recognized.

In particular, while word sequence 122 includes multiple individual words, whole sentence RNN LM 110 directly models the probability for the whole sentence in word sequence 122. In one example, whole sentence RNN LM 110 may be trained to predict the probability of a whole sentence directly, without partially computing conditional probabilities for each classified word in the sentence individually.

To facilitate an efficient and accurate computation of a probability of a whole sentence, whole sentence RNN LM 110 may represent a whole sentence model integrated with an RNN long short-term memory (LSTM) architecture 130.

The whole sentence model of whole sentence RNN LM 110 is not trained with a chain rule as a locally conditional model. In particular, a LM trained with a chain rule as a locally conditional model may be limited to the local conditional likelihood of generating the current word given the word context, thus making local decisions at each word, rather than exploiting whole sentence structures when computing a probability as performed by whole sentence RNN LM 110.

In addition, in particular, an LM run on a neural network or other type of architecture may be limited to computing probabilities for a set length of words selected when training the LM, in contrast to an RNN LSTM architecture 130, which has a long memory and can compute the probability of a whole sentence of an arbitrary length. The addition of LSTM elements in the RNN within RNN LSTM architecture 130 increases the amount of time that data can remain in memory over arbitrary time intervals, increasing the ability of whole sentence RNN LM 110 to classify, process, and predict sequential series as a whole and to minimize the exploding and vanishing gradient problem that may be present when training a standard RNN. In addition, an RNN LSTM architecture has less relative sensitivity to gap length in comparison to a standard RNN, feedforward neural network or n-gram model.

RNN LSTM architecture 130 may be implemented in one or more configurations including one or more layers and including unidirectional and bidirectional layers. While the present invention is described with reference to whole sentence RNN LM 110 implemented in RNN LSTM architecture 130, in additional or alternate embodiments, whole sentence RNN LM 110 may also be implemented in additional or alternate neural network architectures, such as a conventional recurrent neural network or conventional neural network, may be implement. In addition, RNN LSTM architecture 130 may implement additional standard RNN and NN layers. In one example, an NN layer may represent a feedforward NN in which each layer feeds into the next layer in a chain connecting the inputs to the outputs. In one example, in a feedforward NN, at each iteration t, values of the inputs nodes are set and then the inputs are fed forward at each layer in a network, which overwrites previous activations. In contrast, a standard RNN more efficiently manages inputs that may exhibit a sequential relationship, such as predicting the next word in a sentence. In a standard RNN architecture, at each time step t, a hidden layer receives inputs from both the current inputs and from the same hidden layer at a previous time step. RNN LSTM architecture 130 further extends a standard RNN architecture by adding LSTM elements that increase the amount of time data can be held in memory over arbitrary periods of time.

In one example, in training whole sentence RNN LM 110, to avoid a problem of normalizing the whole sentence within word sequence 122 when computing a probability of a whole sentence, a training controller 132 may control training of whole sentence RNN LM 110 by applying noise contrastive estimation (NCE) 134 to training data. In one example, NCE 134 may represent a sampling-based approach for unnormalized training of statistical models. In one example, using NCE 234, rather than maximize the likelihood of the training data, NCE 134 generates a number of noise samples for each training sample and implicitly constrains the normalization term to be "1". Training controller 132 trains the parameters of whole sentence RNN LM 110 to maximize the likelihood of a binary prediction task that identifies the ground truth from the noise samples. In particular, NCE 134 may perform a nonlinear logistic regression to discriminate between the observed training data and the artificially-generated noise data.

For example, to apply NCE 134, mathematically, let $X=(x_1, x_2, \ldots, x_S)$ be the S sentences in training data. In addition, let $Y=(y_1, y_2, \ldots, y_{vS})$ with the v*S samples drawn from a noise sampler model with a probability of density of $p_n(.)$, where v>1. A density estimate of whole sentence RNN LM 110 may be denoted by $p_m(., \theta)$. In one example, the NCE 134 loss may be defined as:

$$l(\theta) = \sum_{i=1}^{S} \ln[h(x_i; \theta)] + \sum_{i=1}^{vS} \ln[1 - h(y_i; \theta)]$$

where $$h[u; \theta] = \frac{1}{1 + v\exp(-G(u; \theta))}$$

and $G(u; \theta)$ is the log-odds ratio between $p_m(., \theta)$ and $p_n(.)$, i.e. $G(u; \theta)=\ln p_m(., \theta)-\ln p_n(n)$. In one example, by optimizing the loss function of $l(\theta)$ with model parameters $\theta$, the model $p_m$ may learn the probability density of X in the limit.

In one example, during training of whole sentence RNN LM 110 by training controller 132 that is based on NCE 134, only the connections associated with a few words in the output layer need to be considered, allowing elimination of the need to compute the normalization over the full output vocabulary. NCE 134 may implicitly constrain the variance of the normalization term to be very small during training, which may make it feasible to use unnormalized probabilities during testing. With a sufficient number of noise samples, the solution to a binary prediction model of whole sentence RNN LM 110 converges to the maximum likelihood estimate on the training data.

The results of whole sentence RNN LM 110 applied by NLP system 100 to perform processing tasks to output processed sequence of words 116 may be presented on a range of tasks from sequence identification tasks, such as palindrome detection, to large vocabulary automatic speech recognition (LVCSRT) and conversational interaction (CI).

Figure 2:
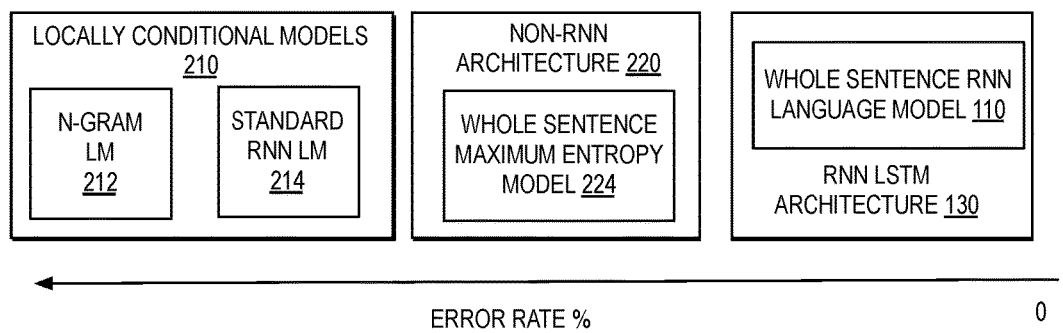
FIG. 2 is a block diagram illustrating a whole sentence RNN LM for natural language processing in comparison with locally-conditional models and non-RNN architecture models for whole sentence processing.

FIG. 2 illustrates a block diagram of a whole sentence RNN LM for natural language processing in comparison with locally-conditional models and non-RNN architecture models for whole sentence processing.

In one example, NLP systems, such as NLP system 100, may access one or more types of models for predicting a probability over a sequence of words, with different error rates. In one example, the error rate may indicate the error rate of a task performed by the NLP system, impacted by the probability predicted by the language model implemented by the NLP system. In one example, an NLP system implementing a whole sentence RNN LM 110 has a lowest error rate in comparison with an error rate of NLP systems implementing a whole sentence maximum entropy model 224 run in a non-RNN architecture 220 or locally conditioned models 210.

In one example, whole sentence RNN LM 110 represents a whole sentence recurrent language model that is not constrained by locally-conditional constraints. In contrast, locally conditional models 210 may represent one or more types of models that are trained based on a chain rule or other locally-conditional constraints. In one example, a locally-conditional constraint may represent a training criteria that generates a local conditional likelihood of generating a current word given the word context, thus locally computing conditional probabilities for each word, rather than modeling the probability of a whole sentence or utterance. A locally-conditional design effectively limits the ability of the LM to exploit whole sentence structures and increases the error rate percentage of tasks performed by NLP systems based on the probabilities predicted by locally conditioned models 210. In contrast, whole sentence RNN LM 110 receives word sequence 122 and assigns a probability for entire word sequence 114, for a whole sentence within word sequence 122, to directly model the probability of a whole sentence or utterance and decrease the error rate percentage of tasks performed based on probabilities predicted by whole sentence RNN LM 110.

In one example, locally conditional models 210 may include n-gram LM 212 and standard RNN LM 214. In one example, n-gram may refer to a contiguous sequence of n items from a given sample of text or speech and n-gram LM 212 may represent a probabilistic language model for predicting the next item in a sequence in the form of a n−1 order Markov model. In one example, standard RNN LM 214 may represent a language model implemented on a standard RNN. N-gram LM 212 and standard RNN LM 214 may represent language models that are constrained by locally-conditional constraints. In particular, in one example, n-gram LM 212 and standard RNN LM 214 may represent statistical language models that are conditional models constrained by local-conditioned constraints by estimating the probability of a word given a previous word sequence. For example, the probability of a sentence s of T words $w_1$, $w_2, \ldots, w_T$ may be calculated as the product of word probabilities by using a chain rule, $$p(s) = p(w_1, \ldots, w_T) = \prod_{t=1}^{T} p(w_t | h_t)$$

where $h_t = w_1, \ldots, w_{t-1}$ is the history of word $w_t$. A limitation of locally conditional models trained using a chain rule is that a captured context is dependent on the length of a history, which is often truncated to the previous n−1 words, since long histories are rarely observed in training data for an n-gram LM 212. For example, n-gram LM 212 may estimate the conditional probability of the next word given the history using counts computed from the training data, but the history of word $w_t$ may be truncated to the previous n−1 words, which may be less than five words. While standard RNN LM 214 may exploit word dependencies over a longer context window than what is feasible with an n-gram language model, standard RNN LM 214 is still trained with the locally-conditional design of the chain rule at each word, which limits the ability of standard RNN LM 214 to exploit the whole sentence structure. In one example, standard RNN LM 214 may also refer to a feed forward neural network LM that is cloned across time with the hidden state at time step (t−1) concatenated with the embedding of the word $w_t$ to form the input that predicts the next word $w_{t+1}$. In one example, a feed-forward neural network LM may embed the word history into a continuous space and use the neural network to estimate the conditional probability, such that the conditional likelihood of $w_{t+1}$ is influenced by the hidden states at all previous time steps $1, \ldots, t$. While standard RNN LM 214 may have the capability to capture a longer context than n-gram LM 212, in practice when standard RNN LM 214 is trained with the local conditional likelihood of generating the current word given the word context, the history may be truncated to the previous 15-20 words in order to speed up training and decoding and global sentence information may be difficult to capture without triggering exploding or vanishing gradient problems. In addition, the locally-conditional design of standard RNN LM 214 may make implicit interdependence assumptions that may not always be true, increasing the rate of errors.

In one example, a whole sentence maximum entropy model 224 may directly model the probability of a sentence or utterance, but not within an RNN architecture. In one example, whole sentence maximum entropy model 224 may function independent of locally conditional models 210, in a non-RNN architecture 220, with flexibility of having custom sentence-level features, such as length of sentence, which are hard to model via locally conditional models 210. In one example, an NLP system implementing whole sentence maximum entropy model 224 for a task may provide processed sequences of words at an error rate that is lower than locally conditional models 210, however, the average error rate achieved by the NSP system implementing non-RNN model 220 may still be greater than the average error rate of an NLP system implementing whole sentence RNN LM 110 operating within an RNN LSTM architecture 130.

In one example, whole sentence RNN LM 110 may be trained to predict the probability of a sentence p(s) directly, without computing conditional probabilities for each word in the sentence independently as performed by locally conditional models 210. In one example, whole sentence RNN LM 110 may represent an instance of whole sentence maximum entropy model 224 or another whole sentence model, extended for application in RNN LSTM architecture 130, to create a whole sentence neural network language model. In one example, extending whole sentence maximum entropy model 224 to efficiently and effectively function in RNN LSTM architecture 130, may including specifying training controller 132 to train whole sentence maximum entropy model 224 to function in RNN LSTM architecture 130, applying NCE 134 for generating additional training samples.

In one example, in additional or alternate examples, training controller 132 may apply additional or alternate types of training to whole sentence RNN LM 110. In the example, while applying a softmax computation to compute conditional probabilities of entire sentences may be problematic for training whole sentence RNN LM 110 because a calculation of z in a softmax computation may be infeasible because it may involve summing all possible sentences, in additional or alternate embodiments, training controller 132 may apply one or more types of softmax computations and other types of computations for training one or more models applied by natural language processing system 100.

In one example, whole sentence RNN LM 110, as trained by training controller 132, may aim to assign a probability to each whole sentence, with higher scores assigned to sentences that are more likely to occur in a domain of interest. In contrast, while whole sentence RNN LM 110 may also integrate sentence-level convolutional neural network models that rely on classifying a sentence with a class label for one of N given categories, a convolutional neural network model may still only provide a conditional model for performing classification tasks based on class labels, with the limitations of locally conditional models 210, and a class label assignment may not accurately predict the likelihood of a sentence being correct.

Figure 3:
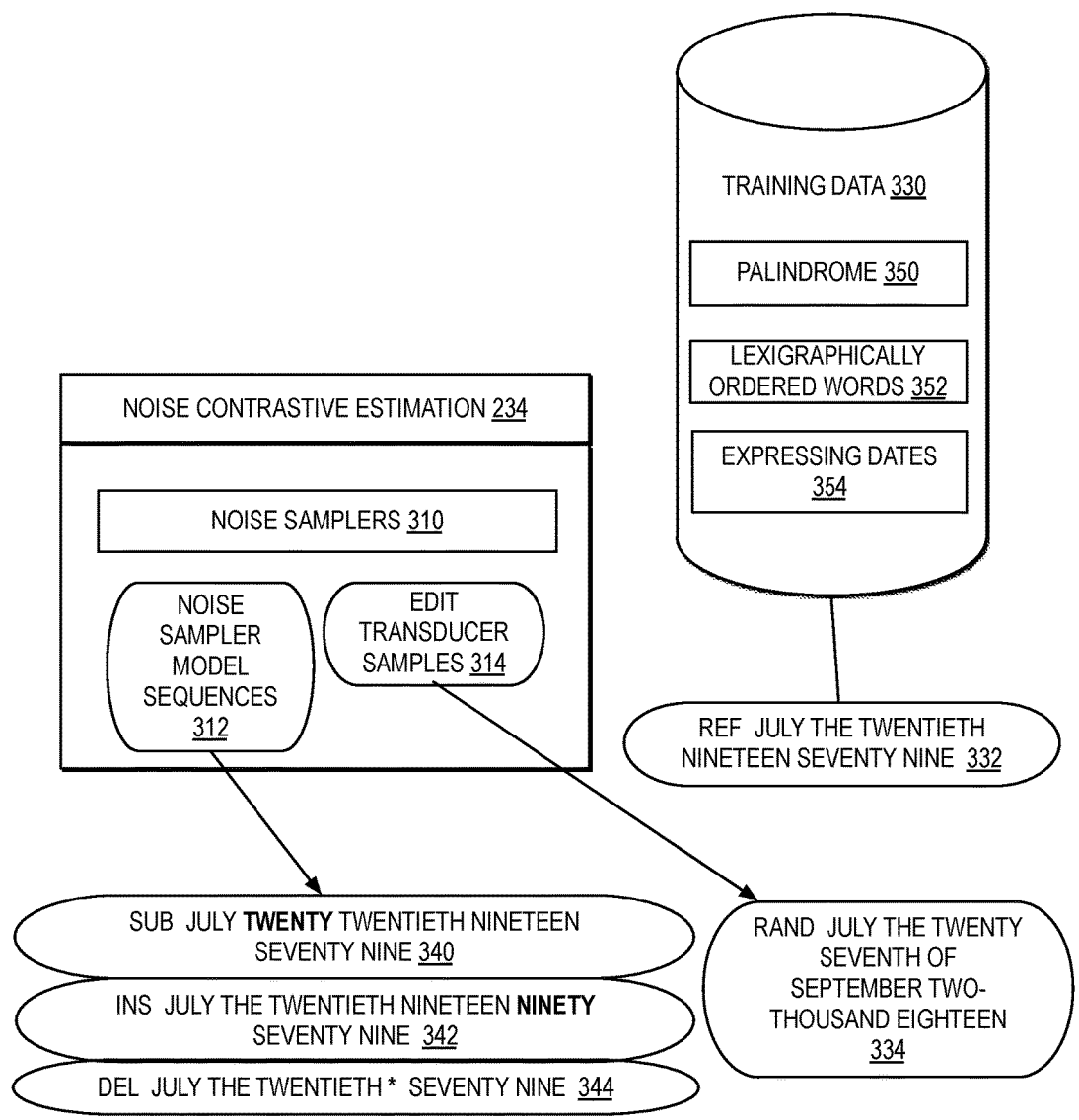
FIG. 3 is a block diagram illustrating one example of components of noise contrastive estimation applied by a training controller to generate incorrect sentences to use with correct sentences to train a whole sentence RNN LM.

FIG. 3 illustrates a block diagram of one example of components of noise contrastive estimation applied by a training controller to generate incorrect sentences to use with correct sentences to train a whole sentence RNN LM.

In one example, NCE 134 may implement one or more types of noise samplers 310 for sampling training data 330. In one example, NCE 134 is specified for training whole sentence RNN LM 110 by sampling entire sentences from a training data 330, as opposed to only sampling word samples for speeding up other types of computations, such as softmax computations.

In one example, training data 330 may include one or more corpus of types of data for training whole sentence RNN LM 110 to generate an un-normalized probability for an entire sentence. In one example, training data 330 may include a corpus of data including one or more of palindrome (PAL) 350, lexicographically-ordered words (SORT) 352, and expressing dates (DATE) 354. In one example, palindrome 350 may include a 1-million word corpus with a 10-word vocabulary of sequences which read the same backward and forward, including examples such as "the cat ran fast ran cat the". In one example, lexicographically-ordered words 352 may include a 1-million word corpus with a 15-word vocabulary of sequences of words in alphabetical order, including examples such as "bottle cup haha hello kitten that what". In one example, expressing dates 354 may include a 7-million word corpus with a 70-word vocabulary of words expressing dates, including examples such as "January first nineteen oh one".

In one example, based on correct sentences in sampling training data 330, NCE 134 may generate a sufficient number of samples for unnormalized training of whole sentence RNN LM 110, where whole sentence RNN LM 110 may learn the data distribution with a normalization term implicitly constrained to 1.

In one example, noise samplers 310 may include one or more back-off n-gram LMs built on training data 330 as noise samplers. In additional or alternate examples, noise samplers 310 may include additional or alternate types of LMs implemented for noise sampling.

In one example, noise samplers 310 may generate or more types of noise samples from training data 330, such as, but not limited to, noise sampler model sequences 312 and edit transducer samples 314. In one example, noise sampler 310 may generate noise samples from training data 330 using a single type of sampler or multiple types of samplers. In one example, each of the noise samples generated by noise samplers 310 may represent an incorrect sentence for use by training controller 132 with correct sentences in training data 330 to train whole sentence RNN LM 110.

In one example, noise sampler model sequences 312 may represent word sequences using a noise sampler model such as an n-gram LM 212 or standard RNN LM 214, by first randomly selecting one sentence from training data 330, such as the reference sentence illustrated at reference numeral 332, and then randomly selecting N positions to introduce a substitution (SUB), an insertion (INS), or deletion (DEL) error. For example, the SUB sampled sentence of "July twenty twentieth nineteen seventy nine" illustrated at reference numeral 340 includes a substitution of "twenty" for "the" from the reference sentence illustrated at reference numeral 332. In addition, for example, the INS sampled sentence of "July the twentieth nineteen ninety seventy nine" illustrated at reference numeral 342 includes an insertion of "ninety" between "nineteen" and "seventy" from the reference sentence illustrated at reference numeral 332. In addition, for example, the DEL sampled sentence of "July the twentieth*seventy nine" illustrated at reference numeral 344 includes a deletion of "nineteen" from the reference sentence illustrated at reference numeral 332.

In one example, edit transducer samples 314 may include word sequences generated from training data 330 using a random (RAND) noise sampler model. For example, from a reference sentence from expressing dates 354 in training data 330 of "July the twentieth nineteen seventy nine" as illustrated at reference numeral 332, noise samplers 310 may generate noise sampler model sequences 312 of "July the twenty fifth of September two-thousand eighteen" as illustrated at reference numeral 334. In one example, the RAND noise sampler model may randomly select one sentence from the training data, and then randomly select N positions to introduce an insertion, substitution or deletion error into the sentence. The probability of a word to be inserted or substituted with is assigned by the noise sampler model based on the n-gram history at the position being considered to ensure that each noisy sentence, with errors, has an edit distance of at most N words from the original sentence. In one example, a separate noise score may be assigned to each sentence in edit transducer samples 314 by noise samplers 310, where the noise score is the sum of all n-gram scores in the sentence.

In the example, sampling from noise sampler model sequences 312 may limit the length of sentences, based on the length of sentence handled by the noise sampler model. For example, n-gram LM 212 based noise sampler model sequences may be limited to shorter sentences. For the types of errors that may be encountered in speech recognition tasks, however, the additional length provided by edit transducer samples 314 may allow for covering a larger noise space and avoid reducing generalization over the types of errors that may be encountered in speech recognition tasks.

Figures 4, 5:
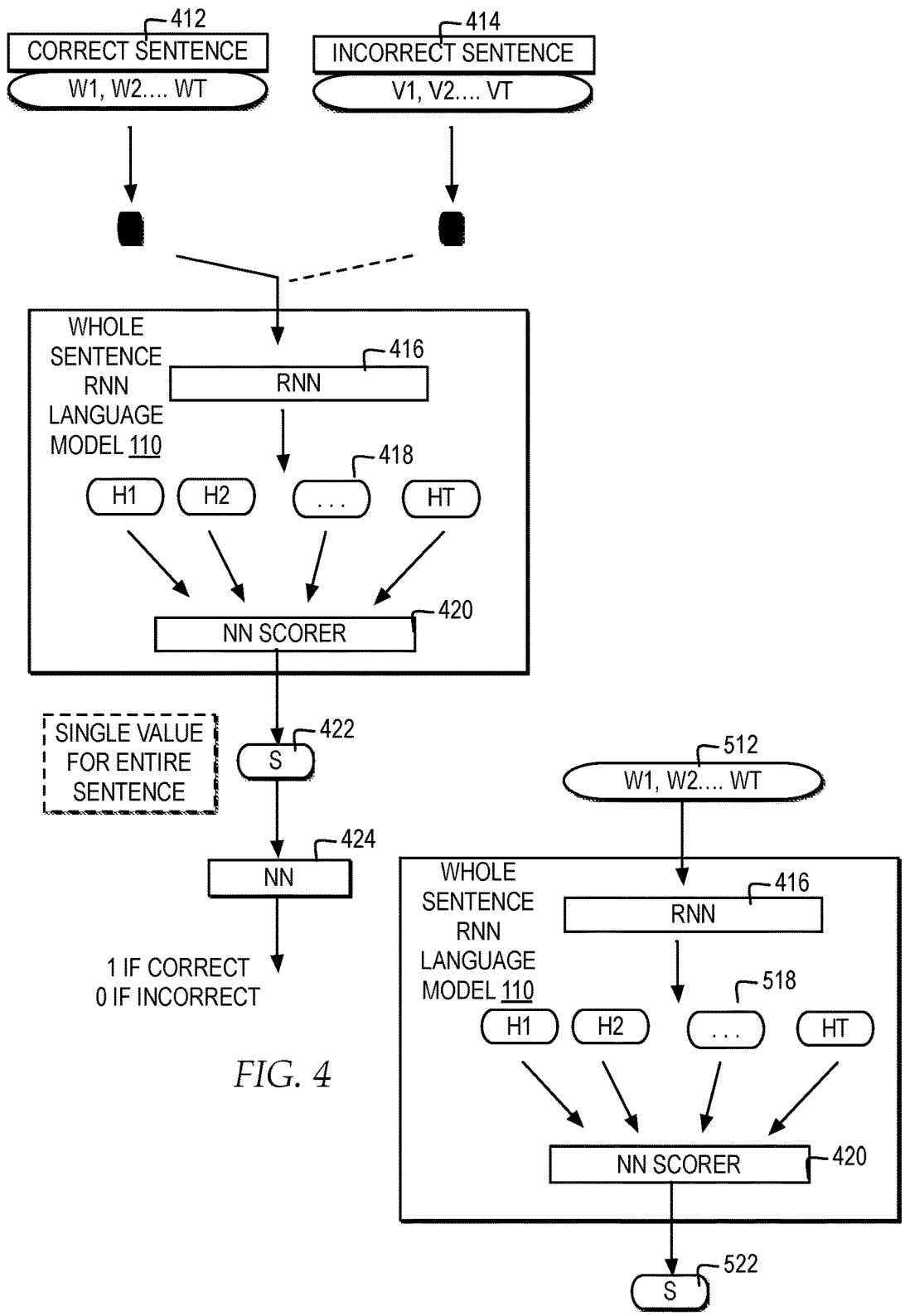
FIG. 4 is a block diagram illustrating a training sequence for training a whole sentence RNN LM using correct sentences in training data and incorrect sentences generated from the training data through noise contrastive estimation.
FIG. 5 is a block diagram illustrating a testing sequence for testing a whole sentence RNN language model using entire sentences.

FIG. 4 illustrates a block diagram of a training sequence for training a whole sentence RNN LM using correct sentences in training data and incorrect sentences generated from the training data through noise contrastive estimation.

In one example, training data used to train whole sentence RNN LM 110 may include a correct sentence 412, from training data 330, and at least one incorrect sentence 414, generated by noise samplers 310 from training data 330. In one example, training controller 132 may feed forward pass both correct sentence 412 and incorrect sentence 414 to RNN 416 to train whole sentence RNN LM 110. For example, RNN 416 receives inputs $w_1, w_2, \ldots, w_T$, for a correct sentence 412 and inputs $v_1, v_2, \ldots, v_T$ for an incorrect sentence 414. In one example, noise samplers 310 may generate N incorrect sentences based on correct sentence 412 and feed forward pass each of the N incorrect sentences. In one example, RNN 416 may represent one or more layers implemented within RNN LSTM architecture 130.

RNN 416 may sequentially update layers based on the inputs, learning correct sentences from inputs $w_1, w_2, \ldots, w_T$ for correct sentence 412 as distinguished from inputs $v_1, v_2, \ldots, v_T$ for incorrect sentence 414, to train whole sentence RNN LM 110 to classify correct sentence 412 from incorrect sentence 414, with outputs from a hidden layer for the entire sentence illustrated by $h_1, h_2, \ldots, h_T$ 418. An NN scorer 420 receives $h_1, h_2, \ldots, h_T$ 418 as inputs and is trained to score a single value s 422 for the entire sentence, where s is an unnormalized probability of the entire sentence. A NN 424 receives S and determines an output of "1" if the input is a probability indicating the entire sentence is correct and an output of "0" if the input is a probability indicating the entire sentence is not correct.

In one example, training controller 132 may pass a next correct training sentence 412 and next incorrect sentence 414 through whole sentence RNN LM 110 and NN 424 for each selection of training sentences selected to train whole sentence RNN LM 110.

FIG. 5 illustrates a block diagram of a testing sequence for testing a whole sentence RNN language model using entire sentences.

In one example, in testing whole sentence RNN LM 110, a tester may input a word sequence 112 into whole sentence RNN LM 110, as illustrated by inputs $w_1, w_2, \ldots, w_T$ 512. In one example, RNN 416 receives the inputs for an entire sentence of $w_1, w_2, \ldots, w_T$ 512 which results in output from a hidden layer for the entire sentence illustrated by $h_1, h_2, \ldots, h_T$ 418. NN scorer 420 receives $h_1, h_2, \ldots, h_T$ 518 as inputs and scores a single value s 522 for the entire sentence, where s is an unnormalized probability of the entire sentence, based on the training of whole sentence RNN LM 110 for correct sentence 412. In the example, depending on the type of testing performed, single value s 522 may be further evaluated to determine whether the probability of the entire sentence matches an expected result.

Figure 6:
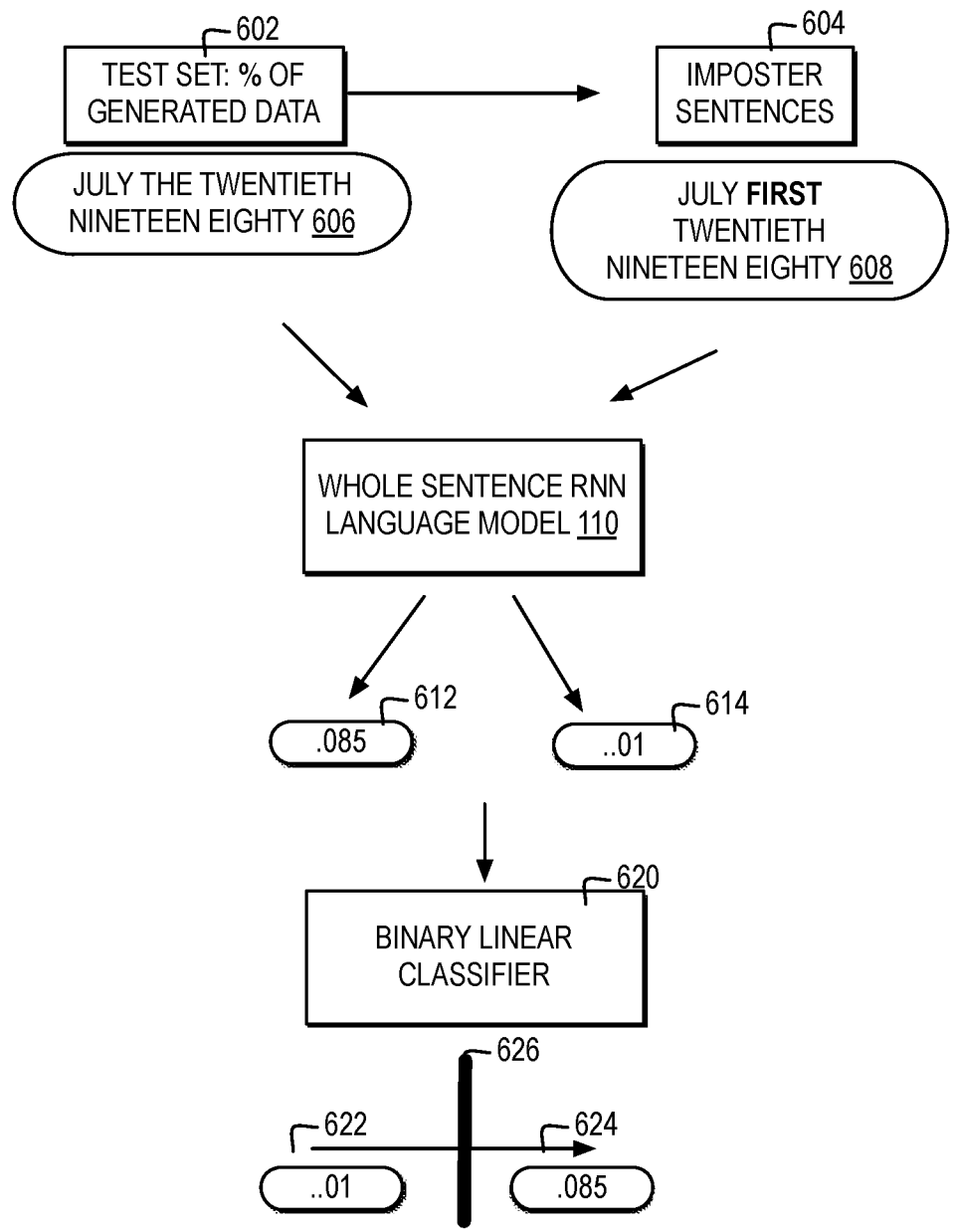
FIG. 6 is a block diagram illustrating one example of a performance evaluation of the accuracy of sequence identification tasks performed in an NLP system implementing a whole sentence RNN LM.

FIG. 6 illustrates a block diagram of one example of a performance evaluation of the accuracy of sequence identification tasks performed in an NLP system implementing a whole sentence RNN LM.

In one example, for evaluating the performance of the classification accuracy for sequence identification tasks by an NLP system implementing whole sentence RNN LM 110, initially, a percentage of the generated data in a training set, such as 10% of the generated data in a corpus of expressing dates 354, may be applied as a test set 602. In one example, a training set sentence may include "July the twentieth nineteen eighty" as illustrated at reference numeral 606.

In one example, for testing, multiple imposter sentences 604 are generated for each training set sentence by substituting one word, such as applied by the sub task in noise sampler model sequences 312. In one example, an imposter sentence may include "July first twentieth nineteen eighty", where the word "the" from the training set sentence has been substituted with the word "first", as illustrated at reference numeral 608.

Next, whole sentence RNN LM 110 may determine scores for each of the sentences. For example, whole sentence RNN LM 110 may assign a score 612 of "0.085" to the training set sentence illustrated at reference numeral 606 and a score 614 of "0.01" to the imposter sentence illustrated at reference numeral 608.

In a next step, a binary linear classifier 620 may be trained to classify the scores output by whole sentence RNN LM 110 into two classes. For example, binary linear classifier 620 may be trained to classify scores by using a linear boundary 626 to distinguish the linear space between a first class 622, which represents an incorrect sentence, and a second class 624, which represents a correct sentence. The performance of an NLP system in performing sequential classification tasks may be evaluated by the classification accuracy assessed by binary linear classifier 620 of classifying imposter sentences in first class 622 and classifying test data sentences in second class 624.

Figure 7:
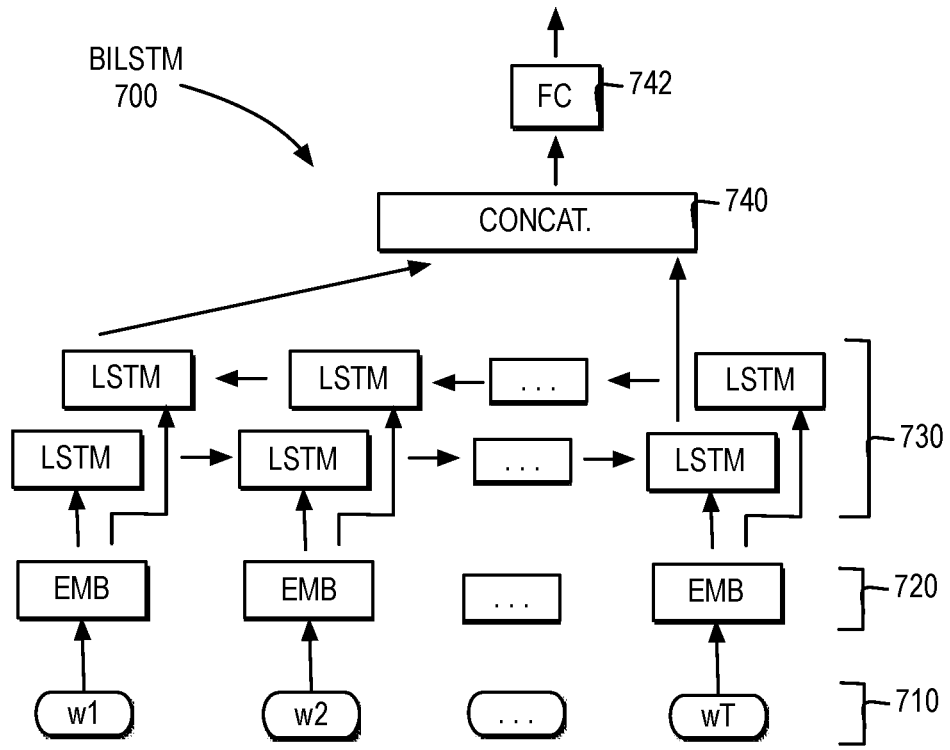
FIG. 7 is a block diagram illustrating one example of a one layer bidirectional LSTM (BiLSTM) configuration of a whole sentence RNN language model.

FIG. 7 illustrates a block diagram of one example of a one layer bidirectional LSTM (BiLSTM) configuration of a whole sentence RNN language model.

In one example, in a one layer BiLSTM 700, an LSTM layer 730 may be loaded once from beginning to end and once from end to beginning, which may increase the speed at which BiLSTM learns a sequential task in comparison with a one directional LSTM. For example, BiLSTM 700 may receive each of inputs $w_1, w_2, \ldots, w_T$ 710 at an embedding layer 720, with an embedding node for each word w. In one example, each word is loaded through the embedding layer to two LSTM within LSTM layer 730, one at the beginning of a loop and one at the end of a loop. In one example, the first and last LSTM outputs from LSTM layer 730 may feed forward outputs to a concatenation layer 740. In one example, concatenation layer 740 may represent a layer of NN scorer 420. Concatenation layer 740 may concatenate the outputs, providing double the number of outputs to a next fully connected (FC) 742. FC 742 obtains the final score of the sentence. In one example, BiLSTM 700 may include additional or alternate sizes of embedding layer 720 and LSTM layer 730, such as include an embedding size of two hundred in embedding layer 720, with seven hundred hidden LSTM units in LSTM layer 730. While in the example, concatenation layer 740 is illustrated receiving the first and last LSTM outputs from LSTM layer 730 and concatenating the outputs, in additional or alternate examples, concatenation layer 740 may receive additional LSTM outputs and in additional or alternate examples, concatenation layer 740 may be replaced by an alternative NN scoring layer that applies one or more scoring functions to multiple outputs from LSTM layer 730.

Figure 8:
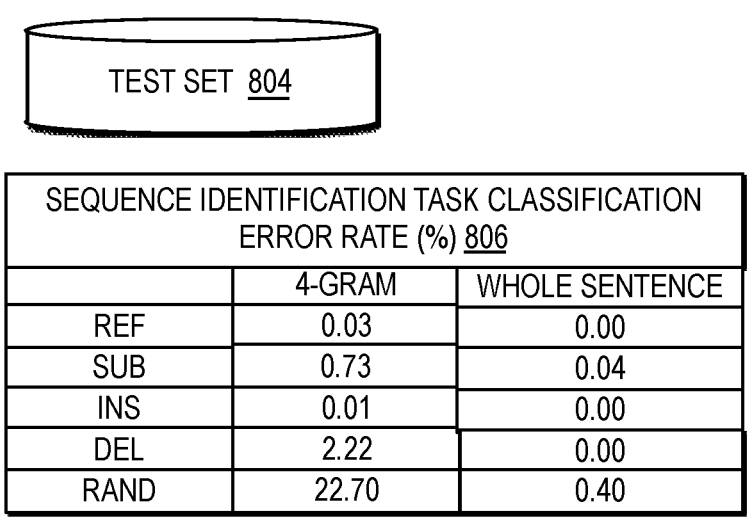
FIG. 8 is a block diagram illustrating an example of the classification accuracy of an n-gram LM compared with a whole sentence RNN LM implemented in NLP systems for performing sequence identification tasks.

FIG. 8 illustrates a block diagram of an example of the classification accuracy of an n-gram LM compared with a whole sentence RNN LM implemented in NLP systems for performing sequence identification tasks.

In one example, a table 806 illustrates the sequence identification task classification error rates for a test set 804, which may be determined by binary linear classifier 620 in FIG. 6. In one example, the test set 804 may include the corpus of training data 330 including one or more of palindrome (PAL) 350, lexicographically-ordered words (SORT) 352, and expressing dates (DATE) 354. In one example, for testing, a percentage of test set 804 may be selected and imposter sentences generated for each of the selected sentences from date test set 804 using each of the noise sampler types, including a sub task, an ins task, a del task, and a rand task, as applied in FIG. 6.

In one example, table 806 illustrates the classification error rates for n-gram LM 212, set to a 4 word length, and whole sentence RNN LM 110, as trained on BiLSTM 700 with an embedding size of 200 and 700 hidden units, trained with training data 330 using stochastic gradient descent and the NCE loss function with a mini-batch size of 512. In one example, for each epoch, a set of 20 noise samples were generated by NCE 134 per data point. In one example, during training, the learning rate may be adjusted using an annealing strategy, where the learning rate may be halved if the heldout loss was worse than a previous iteration.

In the example, the classification accuracy of whole sentence RNN LM 110 for sequence identification tasks for imposter sentences generated by the sub task, the ins task, and the del task on average is above 99%. In comparison, the classification accuracy for n-gram LM 212 for sequence identification tasks for imposter sentences is below 99% accuracy. In the example, the accurarcy of each model is evaluated on each model's ability to classify the true sentences from the imposter sentences. In one example, the difference in classification accuracy between whole sentence RNN LM 110 and n-gram LM 212 may be because whole sentence RNN LM 110 does not need to make conditional independence assumptions that are inherent in locally-conditional models like n-gram LM 212.

Figures 9, 10:
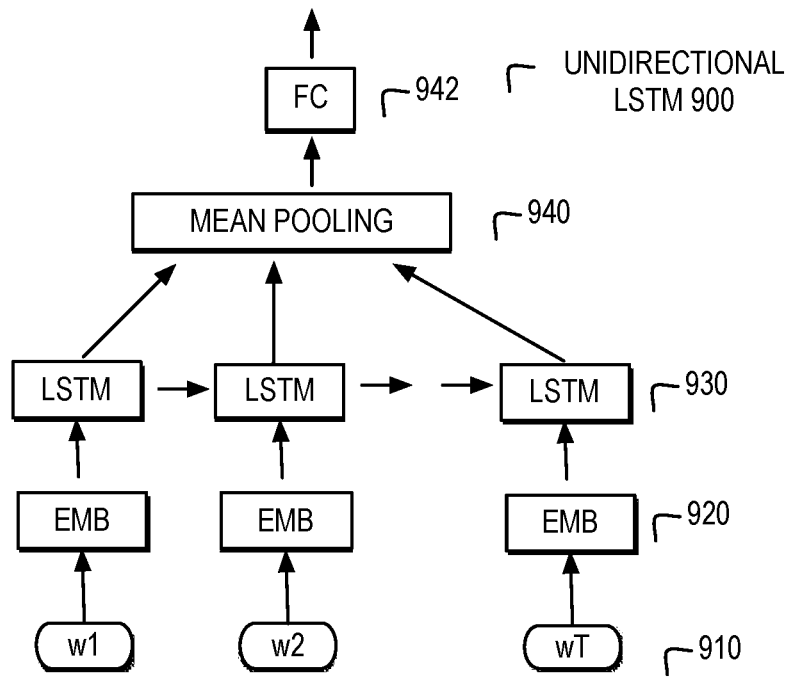
FIG. 9 is a block diagram illustrating one example of a one layer unidirectional LSTM configuration of a whole sentence RNN language model.
FIG. 10 is a block diagram illustrating an example of the word error rate of an n-gram LM compared with a whole sentence RNN LM implemented by a NLP system for speech recognition tasks, applied on a unidirectional LSTM.

FIG. 9 illustrates a block diagram of one example of a one-layer unidirectional LSTM configuration of a whole sentence RNN language model.

In one example, a one-layer unidirectional LSTM 900, an LSTM layer 930 is loaded from left to right. For example, unidirectional LSTM 900 may receive each of inputs $w_1, w_2, \ldots, w_T$ 910 at an embedding layer 920, with an embedding node for each word w. In one example, each word is loaded through the embedding layer to an LSTM within LSTM layer 930, and LSTM loads words to a next LSTM within LSTM layer 930. In one example, each LSTM may feed forward outputs to a mean pooling layer 940. In one example, mean pooling layer 940 may represent a layer of NN scorer 420. Mean pooling layer 940 may pool the outputs over hidden states at each time step into a mean value passed to a next layer FC 942, which obtains the final score of the sentence. In one example, unidirectional LSTM 900 may include additional or alternate sizes of embedding layer 920 and LSTM layer 930. While in the example, mean pooling layer 940 is illustrated receiving all the LSTM outputs from LSTM layer 930 and taking a mean function of the outputs, in additional or alternate examples, mean pooling layer 940 may receive only a selection of LSTM outputs and in additional or alternate examples, mean pooling layer 940 may be replaced by an alternative NN scoring layer that applies one or more scoring functions to multiple outputs from LSTM layer 930.

FIG. 10 illustrates a block diagram of one example of the word error rate of an n-gram LM compared with a whole sentence RNN LM implemented by a NLP system for speech recognition tasks, applied on a unidirectional LSTM.

In one example, as illustrated in a table 1010, for a speech recognition application, a test set may include a Hub5 Switchboard-2000 benchmark task (SWB) and an in-house conversation interaction task (CI). In one example, each test set may represent a set of data with a duration of 1.5 hours, consisting of accented data covering spoken interaction in concierge and other similar application domains. In one example, for the speech recognition application, the evaluation may be performed using the best scoring paths for 100 N-best lists.

In one example, as illustrated in table 1010, whole sentence RNN LM 110 may be trained for the SWB test set on unidirectional LSTM 900 including a projection layer of 512 embedding nodes in embedding layer 920 and 512 hidden layer elements in LSTM layer 930. In addition, in one example, as illustrated in table 1010, whole sentence RNN LM 110 may be trained for the CI test set on unidirectional LSTM 900 including a projection layer of 256 embedding nodes in embedding layer 920 and 256 hidden layer elements in LSTM layer 930.

In one example, an error rate for performing speech recognition on an NLP system implementing whole sentence RNN LM 110 trained on unidirectional LSTM 900 for a SWB test is 6.3%, which is lower than the error rate of 6.9% if N-gram LM 212 is implemented as the LM. In addition, in one example, an error rate for performing speech recognition on an NLP system implementing whole sentence RNN LM 110 trained on unidirectional LSTM 900 for a CI test is 8.3%, which is lower than the error rate of 8.5% if N-gram LM 212 is implemented as the LM. In the examples, whole sentence RN LM 110 is able to capture sufficient long-term context and correct more errors to improve the downstream performance of natural language processing applications.

For example, for a reference sentence of "actually we were looking at the Saturn S L two", a speech recognition system implementing n-gram LM 212 may allow multiple errors in the output "actually we were looking at the Saturday I sell to" and implementing whole sentence RNN LM 110 may allow a single error in the output "actually we were looking at the Saturn S L too", where the n-gram LM predicted output includes a higher error rate % than the whole sentence RNN LM predicted output. In another example, for a reference sentence of "could you send some soda to room three four five", a speech recognition system implementing n-gram LM 212 may allow errors in the output "could you send some sort of to room three four five" and implementing whole sentence RNN LM 110 may correctly output "could you send some soda to room three four five".

Figure 11:
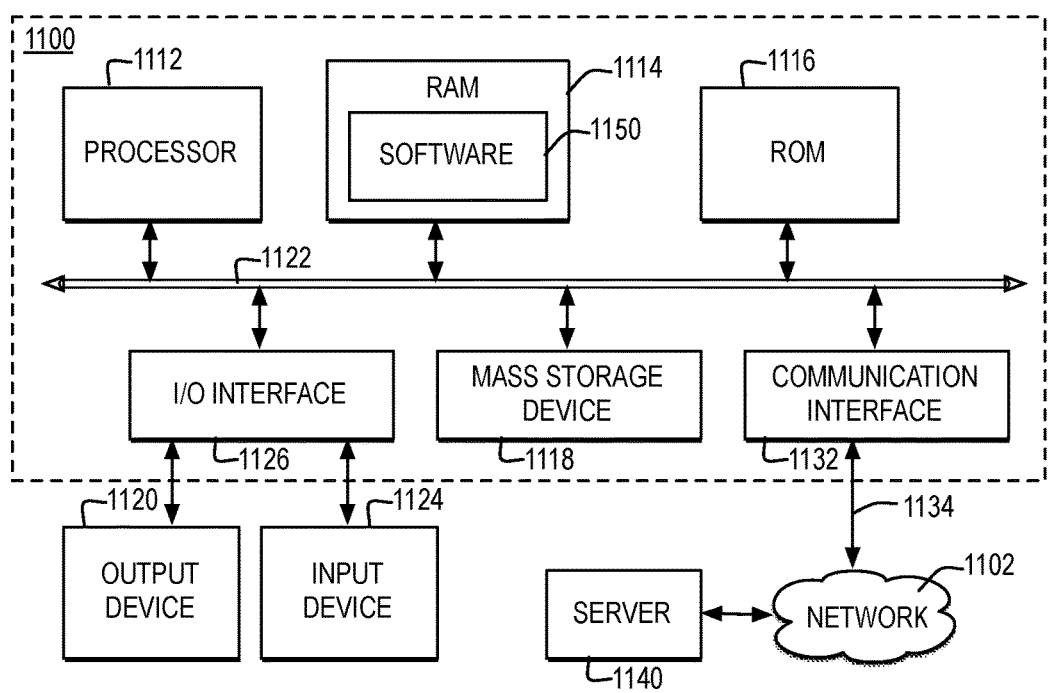
FIG. 11 is a block diagram illustrating one example of a computer system in which one embodiment of the invention may be implemented.

FIG. 11 illustrates a block diagram of one example of a computer system in which one embodiment of the invention may be implemented. The present invention may be performed in a variety of systems and combinations of systems, made up of functional components, such as the functional components described with reference to a computer system 1100 and may be communicatively connected to a network, such as network 502.

Computer system 1100 includes a bus 1122 or other communication device for communicating information within computer system 1100, and at least one hardware processing device, such as processor 1112, coupled to bus 1122 for processing information. Bus 1122 preferably includes low-latency and higher latency paths that are connected by bridges and adapters and controlled within computer system 1100 by multiple bus controllers. When implemented as a server or node, computer system 1100 may include multiple processors designed to improve network servicing power.

Processor 1112 may be at least one general-purpose processor that, during normal operation, processes data under the control of software 1150, which may include at least one of application software, an operating system, middleware, and other code and computer executable programs accessible from a dynamic storage device such as random access memory (RAM) 1114, a static storage device such as Read Only Memory (ROM) 1116, a data storage device, such as mass storage device 1118, or other data storage medium. Software 1150 may include, but is not limited to, code, applications, protocols, interfaces, and processes for controlling one or more systems within a network including, but not limited to, an adapter, a switch, a server, a cluster system, and a grid environment.

Computer system 1100 may communicate with a remote computer, such as server 1140, or a remote client. In one example, server 1140 may be connected to computer system 1100 through any type of network, such as network 1102, through a communication interface, such as network interface 532, or over a network link that may be connected, for example, to network 1102.

In the example, multiple systems within a network environment may be communicatively connected via network 1102, which is the medium used to provide communications links between various devices and computer systems communicatively connected. Network 1102 may include permanent connections such as wire or fiber optics cables and temporary connections made through telephone connections and wireless transmission connections, for example, and may include routers, switches, gateways and other hardware to enable a communication channel between the systems connected via network 1102. Network 1102 may represent one or more of packet-switching based networks, telephony based networks, broadcast television networks, local area and wire area networks, public networks, and restricted networks.

Network 1102 and the systems communicatively connected to computer 1100 via network 1102 may implement one or more layers of one or more types of network protocol stacks which may include one or more of a physical layer, a link layer, a network layer, a transport layer, a presentation layer, and an application layer. For example, network 1102 may implement one or more of the Transmission Control Protocol/Internet Protocol (TCP/IP) protocol stack or an Open Systems Interconnection (OSI) protocol stack. In addition, for example, network 1102 may represent the worldwide collection of networks and gateways that use the TCP/IP suite of protocols to communicate with one another. Network 1102 may implement a secure HTTP protocol layer or other security protocol for securing communications between systems.

In the example, network interface 1132 includes an adapter 1134 for connecting computer system 1100 to network 1102 through a link and for communicatively connecting computer system 1100 to server 1140 or other computing systems via network 1102. Although not depicted, network interface 1132 may include additional software, such as device drivers, additional hardware and other controllers that enable communication. When implemented as a server, computer system 1100 may include multiple communication interfaces accessible via multiple peripheral component interconnect (PCI) bus bridges connected to an input/output controller, for example. In this manner, computer system 1100 allows connections to multiple clients via multiple separate ports and each port may also support multiple connections to multiple clients.

Figure 12:
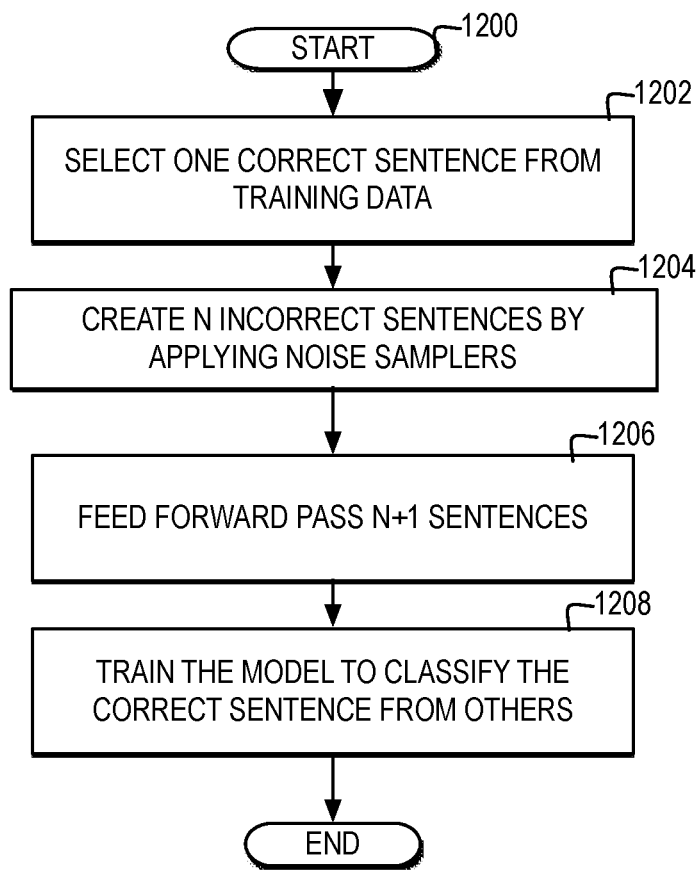
FIG. 12 illustrates a high level logic flowchart of a process and computer program for training a whole sentence RNN LM on an RNN LSTM architecture.
Figure 13:
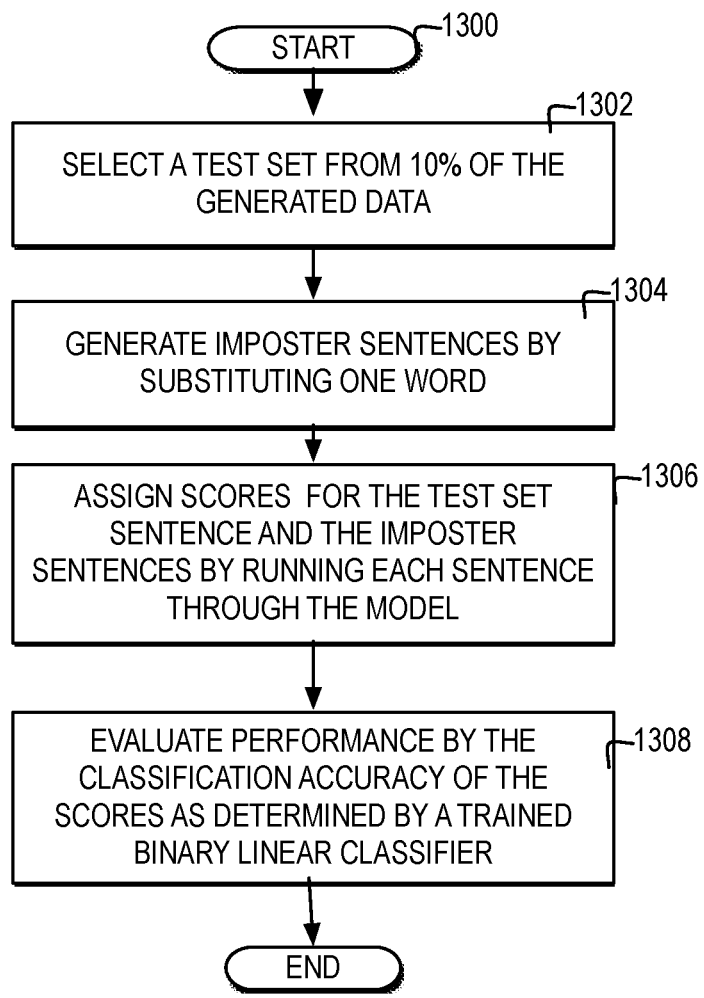
FIG. 13 illustrates a high level logic flowchart of a process and computer program product for testing an NLP system function implementing a whole sentence RNN LM on an RNN LSTM architecture.

In one embodiment, the operations performed by processor 1112 may control the operations of flowchart of FIGS. 12-13 and other operations described herein. Operations performed by processor 1112 may be requested by software 1150 or other code or the steps of one embodiment of the invention might be performed by specific hardware components that contain hardwired logic for performing the steps, or by any combination of programmed computer components and custom hardware components. In one embodiment, one or more components of computer system 1100, or other components, which may be integrated into one or more components of computer system 1100, may contain hardwired logic for performing the operations of flowcharts in FIGS. 12-13.

In addition, computer system 1100 may include multiple peripheral components that facilitate input and output. These peripheral components are connected to multiple controllers, adapters, and expansion slots, such as input/output (I/O) interface 1126, coupled to one of the multiple levels of bus 1122. For example, input device 1124 may include, for example, a microphone, a video capture device, an image scanning system, a keyboard, a mouse, or other input peripheral device, communicatively enabled on bus 1122 via I/O interface 1126 controlling inputs. In addition, for example, output device 1120 communicatively enabled on bus 1122 via I/O interface 1126 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 11, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely, propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 11 may vary. Furthermore, those of ordinary skill in the art will appreciate that the depicted example is not meant to imply architectural limitations with respect to the present invention.

FIG. 12 illustrates a high level logic flowchart of a process and computer program for training a whole sentence RNN LM on an RNN LSTM architecture.

In one example, the process and program start at block 1200 and thereafter proceed to block 1202. Block 1202 illustrates selecting one correct sentence from training data. Next, block 1204 illustrates creating N incorrect sentences by applying noise samplers. Thereafter, block 1206 illustrates applying a feed forward pass for each of the N+1 sentences through the RNN layer, to a NN scorer for generating a single value for each entire sentence, and an additional NN layer for identifying if the single value probability score is correct or not correct. Next, block 1208 illustrates training the model to classify the correct sentence from others, and the process ends.

FIG. 13 illustrates a high level logic flowchart of a process and computer program product for testing an NLP system function implementing a whole sentence RNN LM on an RNN LSTM architecture.

In one example, the process and computer program start at block 1300 and thereafter proceed to block 1302. Block 1302 illustrates selecting a test set from 10% of the generated data. Next, block 1304 illustrates generating imposter sentences by substituting one word in the selected test set sentences. Thereafter, block 1306 illustrates assigning scores for the test set sentence and the imposter by running each sentence through the model. Next, block 1308 illustrates evaluating performance by the classification accuracy of the scores as determined by a trained binary linear classifier.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
providing, by a computer system, a whole sentence recurrent neural network language model for estimating a probability of likelihood of each whole sentence processed by natural language processing being correct;
applying, by the computer system, a noise contrastive estimation sampler against at least one entire sentence from a corpus of a plurality of sentences to generate at least one incorrect sentence;

training, by the computer system, the whole sentence recurrent neural network language model, using the at least one entire sentence from the corpus and the at least one incorrect sentence, to distinguish the at least one entire sentence as correct; and applying, by the computer system, the whole sentence recurrent neural network language model to estimate the probability of likelihood of each whole sentence processed by natural language processing being correct.

2. The method according to claim 1, wherein applying, by the computer system, the whole sentence recurrent neural network language model to estimate the probability of likelihood of each whole sentence processed by natural language processing further comprises:

applying, by the computer system, the whole sentence recurrent neural network language model for the natural language processing comprising one of conversational interaction, conversational telephony speech transcription, multimedia captioning, and translation.

3. The method according to claim 1, wherein providing, by the computer system, a whole sentence recurrent neural network language model for estimating a probability of likelihood of each whole sentence processed by natural language processing further comprises:

providing, by the computer system, the whole sentence recurrent neural network language model on a recurrent neural network long short-term memory architecture.

4. The method according to claim 1, wherein applying, by the computer system, the whole sentence recurrent neural network language model to estimate the probability of likelihood of each whole sentence processed by natural language processing further comprises:

scoring, by the computer system, by the whole sentence recurrent neural network language model, the probability of each whole sentence directly without independently computing conditional probabilities for each separate word in each whole sentence.

5. The method according to claim 1, wherein applying, by the computer system, a noise contrastive estimation sampler against at least one entire sentence from a corpus to generate at least one incorrect sentence further comprises:

applying, by the computer system, the noise contrastive estimation sampler against the at least one entire sentence from the corpus by performing one of a substitution, an insertion, and a deletion of one or more words in the at least one entire sentence to generate the at least one incorrect sentence.

6. The method according to claim 1, wherein applying, by the computer system, a noise contrastive estimation sampler against at least one entire sentence from a corpus to generate at least one incorrect sentence further comprises:

randomly selecting, by the computer system, a plurality of positions in the at least one entire sentence from the corpus to introduce a substitution, an insertion, and a deletion of one or more words in the at least one entire sentence to generate the at least one incorrect sentence.

7. The method according to claim 1, wherein applying, by the computer system, the whole sentence recurrent neural network language model to estimate the probability of likelihood of each whole sentence processed by natural language processing being correct further comprises:

selecting, by the computer system, a selection of the plurality of sentences from the corpus;

applying, by the computer system, the noise contrastive estimation sampler against each sentence in the selection of the plurality of sentences to generate a plurality of imposter sentences;

applying, by the computer system, each separate set of each sentence in the selection of the plurality of sentences and a selection of imposter sentences of the plurality of imposter sentences generated for each sentence to the whole sentence recurrent neural network language model;

generating, by the computer system, through the whole sentence recurrent neural network language model, a first score for each sentence and at least one additional score for the selection of imposter sentences;

applying, by the computer system, a linear boundary to classify the first score and the additional score in one of two classes in a linear space, wherein the two classes represent an incorrect sentence and a correct sentence; and evaluating, by the computer system, an accuracy of the natural language processing system in performing sequential classification tasks based on an accuracy of the classifications of the first score in the class of the correct sentence and at least one additional score as an incorrect sentence.

8. The method according to claim 1, wherein training, by the computer system, the whole sentence recurrent neural network language model, using the at least one entire sentence from the corpus and the at least one incorrect sentence, to distinguish the at least one entire sentence as correct further comprises:

applying, by the computer system, each of the at least one entire sentence from the corpus and the at least one incorrect sentence to at least one recurrent neural network layer comprising a plurality of long short-term memory for holding data for an arbitrary period of time;

pushing, by the computer system, an output from each of the plurality of long short-term memory to a neural network scorer for each of the at least one entire sentence and the at least one incorrect sentence;

generating, by the neural network scorer, a separate output score assigned by the at least one recurrent neural network layer for each of the at least one entire sentence and the at least one incorrect sentence representing an unnormalized probability of each sentence; and evaluating, by a neural network layer receiving output from the whole sentence recurrent neural network language model, each separate output score as an output of a digital 1 if the output score is a probability indicating the entire sentence is correct and an output of a digital 0 if the output score is a probability indicating the entire sentence is not correct.

9. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to provide a whole sentence recurrent neural network language model for estimating a probability of likelihood of each whole sentence processed by natural language processing being correct;

program instructions to apply a noise contrastive estimation sampler against at least one entire sentence from a corpus of a plurality of sentences to generate at least one incorrect sentence;

program instructions to train the whole sentence recurrent neural network language model, using the at least one entire sentence from the corpus and the at least one incorrect sentence, to distinguish the at least one entire sentence as correct; and program instructions to apply the whole sentence recurrent neural network language model to estimate the probability of likelihood of each whole sentence processed by natural language processing being correct.

10. The computer system according to claim 9, wherein the program instructions to apply the whole sentence recurrent neural network language model to estimate the probability of likelihood of each whole sentence processed by natural language processing further comprise:

program instructions to apply the whole sentence recurrent neural network language model for the natural language processing comprising one of conversational interaction, conversational telephony speech transcription, multimedia captioning, and translation.

11. The computer system according to claim 9, wherein the program instructions to provide a whole sentence recurrent neural network language model for estimating a probability of likelihood of each whole sentence processed by natural language processing further comprise:

program instructions to provide the whole sentence recurrent neural network language model on a recurrent neural network long short-term memory architecture.

12. The computer system according to claim 9, wherein the program instructions to apply the whole sentence recurrent neural network language model to estimate the probability of likelihood of each whole sentence processed by natural language processing further comprise:

program instructions to score, by the whole sentence recurrent neural network language model, the probability of each whole sentence directly without independently computing conditional probabilities for each separate word in each whole sentence.

13. The computer system according to claim 9, the program instructions to apply a noise contrastive estimation sampler against at least one entire sentence from a corpus to generate at least one incorrect sentence further comprise:

program instructions to apply the noise contrastive estimation sampler against the at least one entire sentence from the corpus by performing one of a substitution, an insertion, and a deletion of one or more words in the at least one entire sentence to generate the at least one incorrect sentence.

14. The computer system according to claim 9, wherein the program instructions to apply a noise contrastive estimation sampler against at least one entire sentence from a corpus to generate at least one incorrect sentence further comprise:

program instructions to randomly select a plurality of positions in the at least one entire sentence from the corpus to introduce a substitution, an insertion, and a deletion of one or more words in the at least one entire sentence to generate the at least one incorrect sentence.

15. The computer system according to claim 9, wherein the program instructions to apply the whole sentence recurrent neural network language model to estimate the probability of likelihood of each whole sentence processed by natural language processing being correct further comprise:

program instructions to select a selection of the plurality of sentences from the corpus;

program instructions to apply the noise contrastive estimation sampler against each sentence in the selection of the plurality of sentences to generate a plurality of imposter sentences;

program instructions to apply each separate set of each sentence in the selection of the plurality of sentences and a selection of imposter sentences of the plurality of imposter sentences generated for each sentence to the whole sentence recurrent neural network language model;

program instructions to generate, by the whole sentence recurrent neural network language model, a first score for each sentence and at least one additional score for the selection of imposter sentences;

program instructions to apply a linear boundary to classify the first score and the additional score in one of two classes in a linear space, wherein the two classes represent an incorrect sentence and a correct sentence; and program instructions to evaluate an accuracy of the natural language processing system in performing sequential classification tasks based on an accuracy of the classifications of the first score in the class of the correct sentence and at least one additional score as an incorrect sentence.

16. The computer system according to claim 9, wherein the program instructions to train the whole sentence recurrent neural network language model, using the at least one entire sentence from the corpus and the at least one incorrect sentence, to distinguish the at least one entire sentence as correct further comprise:

program instructions to apply each of the at least one entire sentence from the corpus and the at least one incorrect sentence to at least one recurrent neural network layer comprising a plurality of long short-term memory for holding data for an arbitrary period of time;

program instructions to push an output from each of the plurality of long short-term memory to a neural network scorer for each of the at least one entire sentence and the at least one incorrect sentence;

program instructions to generate, by the neural network scorer, a separate output score assigned by the at least one recurrent neural network layer for each of the at least one entire sentence and the at least one incorrect sentence representing an unnormalized probability of each sentence; and program instructions to evaluate, by a neural network layer receiving output from the whole sentence recurrent neural network language model, each separate output score as an output of a digital 1 if the output score is a probability indicating the entire sentence is correct and an output of a digital 0 if the output score is a probability indicating the entire sentence is not correct.

17. A computer program product comprises a computer readable storage medium having program instructions embodied therewith, wherein the computer readable storage medium is not a transitory signal per se, the program instructions executable by a computer to cause the computer to:

provide, by a computer, a whole sentence recurrent neural network language model for estimating a probability of likelihood of each whole sentence processed by natural language processing being correct;

apply, by the computer, a noise contrastive estimation sampler against at least one entire sentence from a corpus of a plurality of sentences to generate at least one incorrect sentence;

train, by the computer, the whole sentence recurrent neural network language model, using the at least one entire sentence from the corpus and the at least one incorrect sentence, to distinguish the at least one entire sentence as correct; and apply, by the computer, the whole sentence recurrent neural network language model to estimate the probability of likelihood of each whole sentence processed by natural language processing being correct.

18. The computer program product according to claim 17, further comprising the program instructions executable by a computer to cause the computer to:

apply, by the computer, the whole sentence recurrent neural network language model for the natural language processing comprising one of conversational interaction, conversational telephony speech transcription, multimedia captioning, and translation.

19. The computer program product according to claim 17, further comprising the program instructions executable by a computer to cause the computer to:

provide, by the computer, the whole sentence recurrent neural network language model on a recurrent neural network long short-term memory architecture.

20. The computer program product according to claim 17, further comprising the program instructions executable by a computer to cause the computer to:

score, by the computer, by the whole sentence recurrent neural network language model, the probability of each whole sentence directly without independently computing conditional probabilities for each separate word in each whole sentence.

* * * * *